3,271,164
ADDITIVE FOR BAKED GOODS TO RETARD STALING

John Jean Richard Andt, Elmhurst, N.Y., assignor to Stein, Hall & Co., Inc., New York, N.Y., a corporation of New York
No Drawing. Filed Jan. 13, 1964, Ser. No. 337,140
8 Claims. (Cl. 99—90)

The present invention relates to a composition useful in retarding staling of bread and other baked goods. The invention also relates to an improved process for preparing bread and other baked goods.

It has been estimated that approximately 10% of the bread and other baked goods manufactured in this country are returned to the baker as "stale return." This considerable problem has received the almost constant attention of the industry over a number of years, and a wide variety of additives have been offered to bakers to help retard the staling of bread and other baked goods. However, few of the additives now available provide a significant increase in shelf-life of baked goods. The present invention is concerned with an improvement in antistaling additives. The use of the additive of this invention provides concomitant benefits of product and process improvements.

In addition to the staleness problem, the baking industry has long been confronted with problems stemming from the wide variability in wheat flours. Flours from wheat are unique in that when water is added thereto to make a dough, two proteins, gliadin and glutenin, unite to form gluten, which in turn form the main support for the cell-like structure of yeast-raised baked goods. The quality of the gluten affects the volume, softness, grain, water-absorption ability, mixing tolerance and floor tolerance of the dough. Wide variations of the quality of gluten cause similar variations in baking qualities of the flours, and in order to produce flours of uniform quality, mills resort to blending of flour varieties, the use of oxidizing agents, and similar procedures to obtain flour having a uniform and predictable baking quality.

Another problem of particular concern to the baker is the tolerance of a given dough formula to overmixing. After water is added to a flour containing dough the flour protein immediately begins to hydrate, and during the course of the first one to four minutes of mixing, will provide a sharp rise in the viscosity of the dough. The dough will continue its development with continuance of the mixing until it reaches its maximum consistency. A continuation of the mixing thereafter causes the viscosity of the dough to eventually fall below the viscosity which it had at the time the water was completely absorbed. Thereafter, the dough is considered to be overmixed, and products prepared with overmixed dough are generally of poor quality, and a higher incidence of cripples is encountered. A prolongation of the time during mixing before the viscosity falls below the viscosity it had at initial complete hydration is desirable.

An object of this invention is to provide an additive for bread and other baked goods which retards staling.

Another object of this invention is to provide an additive which improves the baking quality of both treated and untreated flours.

Another object of this invention is to provide a flour with improved mixing characteristics which remain relatively constant regardless of the flour quality used.

Still another object is to provide a dough having increased tolerance to overmixing.

It has now been found that bread and other baked goods can be improved by the addition thereto of an additive comprising karaya gum and a material selected from the group consisting of algins and carrageenans. The preferred embodiment contains about 80–100% karaya gum and 0–20% of a material selected from the group consisting of algins and carrageenans. The presence of this additive in the bread and other baked goods retards the staling thereof to a substantial degree. At the same time, it provides a number of other advantages both in the final quality of the baked goods and in the processing techniques employed. One of the most important processing advantages is in the improved tolerance of the dough to overmixing. These and other advantages will be explained in more detail below.

Karaya gum, also known as gum karaya, gum kadaya, Indian tragacanth, India gum and Sterculia gum, is obtained as an exudate from the *Sterculia urens* tree. Nearly all karaya gum is imported from India. A detailed description of the gum and its characteristics is found on pages 343–359 of the book, "Industrial Gums," by Roy L. Whistler, copyright 1959 by Academic Press, Inc., 111 Fifth Avenue, New York, New York.

Carrageenan, also known as Irish moss extractive, is a seaweed colloid obtained from the so-called red seaweeds. The characteristics of this material are described in detail on pages 83–115 of "Industrial Gums," supra. Carrageenans are available in various types and grades, each of which reflect the process conditions by which it was recovered, and the degree to which it has been refined. Materials found suitable for use according to this invention include a so-called lambda, or cold water soluble fraction of Irish moss, a material which is primarily a kappa, or hot water soluble fraction of Irish moss, the grades of Irish moss extractives which have undergone a low degree of purification.

The term "algin" is used herein as a generic designation of the derivatives of alginic acid. Included within this term are the sodium, potassium, and ammonium alginates and the propylene glycol alginates. These materials are described in "Industrial Gums," supra, on pages 55–82.

The level of karaya gum present in the baked goods prepared according to this invention should preferably range from about 0.1% to about 0.9%, based on the weight of the flour in the composition. Amounts in excess of about 0.9% are disadvantageous, in that the resulting baked product loses its strength and tends to crumble. Amounts below about 0.1% do not provide the advantages of the compositions of this invention.

Similar considerations apply to the level of the material selected from the group consisting of carrageenans and algins used in the baked goods of this invention. No more than about 0.1% of these materials, based on the weight of the flour present, should be employed. In a preferred composition, at least about 0.02% should be used. A preferred composition contains 90% karaya gum and 10% carrageenan by weight. Another preferred composition contains about 12% carrageenan and about 88% karaya gum. These additives are preferably used at levels of from about 0.1% to 1.0%, based on the weight of flour present.

The additive of this invention may be used in all types of baked goods which are susceptible to staling. Among these are included bread, hamburger and frankfurter rolls, dinner rolls, brown-n-serve rolls, sweet rolls, coffee cakes, donuts and all other types of yeast-raised products. Also included are biscuits, donuts and other chemically leavened baked goods. These bakery products, when prepared with the additive of this invention, retain their moisture for a longer time and the mosture is more uniformly distributed throughout the article. The products stay softer and fresher tasting for at least 10–15% longer. In addition, a live, vital quality is imparted to the crust without darkening the color. The grain has more uniformity, while the texture of the baked goods is improved and the crumb has a truer color and clarity.

Another advantage of considerable importance results from the finding that in baked goods requiring shortening or emulsifier for a desired degree of softness, the amount of shortening or emulsifier can be reduced when the additive of this invention is used, with no sacrifice of the softness characteristic. Further, in some instances it has been found that the degree of softness obtained with the combined use of the additive of this invention and an emulsifier is greater than would be expected from the use of either one alone. For example, the combined use in bread of calcium stearyl 2-lactylate with an additive consisting of 90% karaya gum and 10% carrageenan, provides a bread having a softness far in excess of that obtained with either ingredient alone.

Another important advantage of the use of the additive of this invention is found in the continuous process of preparing bread. At present, the use of non-fat milk solids in a continuous bread-making process is severely limited because it usually results in a bread of smaller loaf volume and a coarser texture. The addition of non-fat milk solids to bread increases flavor and nutritional value and is thus desirable. The additive of this invention permits the use of as much as 4% of non-fat milk solids, basic flour, with no adverse effects on the quality of the product or on the process.

The use of the additive of this invention provides improved production advantages which result in more uniform quality products and in more efficient production techniques. The use of the additive, for example, increases the mixing tolerance, reduces the proof time in some instances, and improves the tolerance of the dough to aging. With regard to the latter, doughs age rapidly during long make-up periods or temporary equipment failure, and cause added difficulty with scaling if they become too old. The use of the additive of this invention reduces this effect. The doughs smooth out with increased floor time and retain their soft, smooth characteristics with reduced tendency to become sticky while being machined. They also pan better, in that doughs prepared with the additive are soft and pliable and uniformly flow into the pan. This, in turn, provides improved appearance in the finished products.

The more uniform mixing and baking performance of doughs containing the additive of this invention results in fewer cripples and rejects. Buns, such as hamburger buns and frankfurter rolls, retain their hinge effect for a longer time and to an improved degree.

The additive of this invention may be used in all of the three standard methods employed in preparing bread doughs for baking. In the sponge-dough method, the additive is preferably added in the sponge stage although nearly equal results are obtained where the additive is included in the dough. In the so-called continuous process, which utilizes a brew stage and a dough stage, the additive may be included at either point, although it is preferred that it be added to the brew. In the straight dough mixing procedure, the additive is added along with the other dry ingredients.

In the preparation of a dough, an amount of water is generally used which is sufficient to fully hydrate the flour, but is not so large as to cause a wet, sticky dough. This amount is determined empirically from flour samples, and is called the absorption value of the flour. When using the additive of this invention, it is necessary that an additional amount of water be added to the dough or batter to insure hydration of the additive. From about five to fifteen or more parts of additional water for one part of additive may be used depending upon the type of dough, the water absorption characteristics of the flour, and the amount of additive employed. The amount of additional water needed can be readily determined by observing the machining characteristics of the dough.

While under normal circumstances the presence of an additional amount of water in the dough would seriously impair its machinability, it has been found that a dough containing the additive of this invention and additional water performs satisfactorily during normal processing. In fact, the doughs prepared according to this invention are easier to handle, in that they are resistant to overmixing.

Although the use of the additive of this invention requires additional amounts of water in the dough, the final moisture content of the baked product is approximately the same as that of the same formulation without the additive. Thus, although the unbaked dough contains a higher level of water than normal, the moisture content of the baked product is substantially the same.

The use of galactomannans, such as guar gum and tara gum, as a supplement to the additive of this invention, may provide antistaling action under some circumstances. However, these gums have the disadvantage of being susceptible to hydrolysis in the presence of the enzymes of bread doughs. For this reason, additives containing these gums should be incorporated at a late stage in the process so that the period of time during which they are subjected to enzymatic activity is maintained at a minimum. One preferred composition following this embodiment contains 70% karaya gum, 20% guar gum and 10% carrageenan.

An instrument called a Farinograph is extensively used in the baking industry to determine physical properties of flours and doughs. The Farinograph is essentially a miniature dough recording mixer by which one may determine a number of important characteristics, which, in turn, help predict the baking performance.

The following are the normal characteristics associated with the Farinograph curves and which are used to evaluate the doughs run.

(1) *Absorption* is defined as the amount of water in a standardized flour-water system required to center a Farinograph curve at the 500 BU (Brabender Units) line.

(2) *Arrival time* is the time for the top of Farinograph curve to reach the 500 BU line, after the mixer is started and water is introduced. This value determines the rate at which the water is absorbed by the flour.

(3) *Dough development time* (or peak time) is the time required for the curve to reach its maximum consistency value.

(4) *Stability* is the difference in time between the arrival of the top of the curve at the 500 BU line, and the time the top of the curve departs from the 500 BU line (departure time). This value indicates the amount of tolerance to mixing the flour will have.

(5) *Tolerance index* (MTI) is defined as the value difference in BU between the BU reached by the top of curve at peak time and the BU reached by the top of curve measured at five minutes after peak time is reached. A related value (TI) is the difference in BU between the 500 line and the center of curve, measured at five minutes after the top of the curve departs from 500 BU line.

A high value indicates a weak flour. A low value denotes a strong flour.

Farinograph curves were run on mixtures of flour, water and an additive made according to this invention. The additive used contained 70% karaya gum, 20% guar gum and 10% Seakem 402, a carrageenan. The additive was used at both a 1% and a 0.5% level, based on the weight of the flour. The data obtained from these curves are summarized below. Curves 1 and 4 were controls which were run to determine absorption of the flour. Curves 2 and 5 were run at the same absorption in order to obtain the approximate absorption of the combination. Curves 3 and 6 were run at the calculated absorption. The data obtained from these curves were as follows:

SET I

| Curve No | 1 | 2 | 3 |
|---|---|---|---|
| Flour | (¹) | (¹) | (¹) |
| Additive, percent | None | 1 | 1 |
| As is absorption (run), percent | 64.7 | 64.7 | 67.9 |
| As is absorption (corrected), percent | 64.7 | 67.9 | 68.6 |
| Arrival time, min | 2¾ | 1½ | 2 |
| Stability, min | 15¼ | 14 | 19 |
| Peak time, min | 7¾ | 3 | 10½ |
| MTI, BU | 15 | 10 | 10 |
| TI, BU | 50 | 65 | 45 |

¹ Spring wheat.

SET II

| Curve No | 4 | 5 | 6 |
|---|---|---|---|
| Flour | (¹) | (¹) | (¹) |
| Additive, percent | None | 0.5 | 0.5 |
| As is absorption (run), percent | 62.9 | 62.9 | 64.4 |
| As is absorption (corrected), percent | 62.9 | 64.4 | 64.6 |
| Arrival time, min | 4 | 3½ | 4½ |
| Stability, min | 15 | 17 | 23¾ |
| Peak time, min | 7 | 9½ | 9 |
| MTI, BU | 15 | 22 | 10 |
| TI, BU | 50 | 50 | 35 |

¹ Hi prot. spring.

The above data show definite absorption increases occasioned by the use of the additive. Also, arrival time with the additive is generally faster than that of the control, indicating a more rapid hydration and better colloidal dispersion. This partially explains the improved grain uniformity and gas retention obtained using the additive of this invention.

The stability increase obtained by using the additive amounts to 25–58% over the control, indicating an increased tolerance to overmixing. The peak time is also increased over the control by using the additive of this invention. This peak time is normally related to optimum mixing and clean-up time. The MTI and TI values show that the flour has been improved in stability and colloidal properties. The TI values are not taken until the doughs show a definite sign of break down, and are therefore a more significant indication of the ability of the dough to withstand overmixing.

The following examples illustrate the additive composition of this invention and its use. It will be understood that these examples are included merely for purposes of illustration and are not intended to limit the scope of the invention as described in this specification unless otherwise specifically indicated.

In the following examples, the levels of ingredients are expressed in terms relative to the complete flour content of the composition. In evaluating the baked products, a control was used for each series. Because baking results vary from day to day, judging of results is more meaningful where reference is made to a control made at the same time. Where differences in characteristics are expressed in terms of percentages, the control is rated as 100%.

The following explanation of terms used in the examples will be helpful.

(1) The term "clean-up time" is the dough stage in the sponge-dough method, and averaged 3.0 minutes using a dough-hook in a Hobart mixer.

(2) "Machining" refers to the machining of dough when sheeted and formed without flouring of the dough.

(3) "Volume" was measured by the rapeseed displacement method and is an average of at least two loaves for each test.

(4) "Softness," unless otherwise indicated, was determined on the Penetrometer using a Penetrometer cone weighing 102.5 grams. The cone was allowed to depress the baked goods for fifteen seconds and the value recorded.

Bread was prepared for the softness determination by slicing it into two 2″ thick slices from the center of the loaf. Three values were taken on each surface of each slice, one value in the center of the slice and one value at half the center to the top of the loaf and one value at half center to the bottom of the loaf. In all, twelve values were obtained for each loaf and all values were then averaged. Softness tests were run after forty-eight hours and additionally on either the 4th, 5th or 6th day. These two softness values were then averaged and compared to average values obtained on test samples of a control run in the same series.

(5) "Symmetry," "oven-spring," "grain" and other loaf characteristics were judged subjectively by the scoring method set forth below.

(6) The scoring method used throughout was as follows:

4 Excellent (Superior nature)
3.5 Very good (Above average results)
3.0 Good (Average results)
2.0 Fair (Below average)
1.0 Poor (Far below average)

*Example 1*

A series of batches of bread were made by the so-called continuous method in continuous mix equipment. Preliminary tests at various levels of water absorption increase over a control indicated that a 5% absorption increase was optimum for the formula containing the additive. On the basis of these preliminary tests, a 5% increase in water level was used throughout this series. The formula used was as follows:

BREW

| Ingredients: | Percent |
|---|---|
| Flour, 50% spring, 50% winter | 25 |
| Water | 62 |
| Yeast (compressed) | 2.75 |
| Yeast food (Arkady) | 0.5 |
| Emulsifier (T.E.M.-tartaric acid ester of glycerol monostearate) | 0.1 |
| Sugar | 1 |
| Salt | 2 |

The brews were made up and set at 85° F. They were thereafter fermented for 2¼ hours.

DOUGH

| | Percent |
|---|---|
| Flour | 75 |
| Water (when no milk solids used) | 5 |
| Water (when 4% milk solids used) | 8 |
| Melted lard | 3 |
| Sugar | 6 |
| Non-fat milk solids | 0.4 |

| | P.p.m. |
|---|---|
| Bromate (KBrO₃) | 48 |
| Iodate (KIO₃) | 12 |

The dough was mixed with the brew to optimum consistency, turned out at 102–103° F., scaled at 539 grams, proofed to ¾″ above pan (approximately 57 minutes) and baked for 17 minutes at 450° F.

Using the basic formula and process set forth above, the following tests were run.

| | | |
|---|---|---|
| 1. Control | No milk solids | 67% absorption. |
| 2. Control | 4% milk solids | 70% absorption. |
| 3. Additive F 0.5% | No milk solids | 72% absorption. |
| 4. Additive F 0.5% | 4% milk solids | 75% absorption. |
| 5. Additive G 1.0% | No milk solids | 72% absorption. |
| 6. Additive G 1.0% | 4% milk solids | 75% absorption. |
| 7. Additive F 0.5% | No milk solids | 72% absorption, ½ oxidizer level. |
| 8. Additive F 0.5% | 4% milk solids | 75% absorption, ½ oxidizer level. |
| 9. Additive F 0.5% 0.2% calcium stearyl 2-lactylate. | No milk solids | 72% absorption. |
| 10. Additive F 0.5% 0.2% calcium stearyl 2-lactylate. | 4% milk solids | 75% absorption. |
| 11. Calcium stearyl 2-lactylate. | No milk solids | 67% absorption. |
| 12. Calcium stearyl 2-lactylate. | 4% milk solids | 70% absorption. |

Additive F comprises 90% karaya gum and 10% carrageenan (Seakem 402). Additive G contains 45% karaya gum, 5% carrageenan, 25% monocalcium acid phosphate and 25% raw potato starch.

The results obtained are given in the following tables:

TABLE 1(a)
[4% Non-fat milk powder—Continuous mix breads]

| Test No | 2 | 4 | 6 | 8 | 10 | 12 |
|---|---|---|---|---|---|---|
| Variables: | | | | | | |
| Flour, percent | 100 | 100 | 100 | 100 | 100 | 100 |
| Water, percent | 70 | 75 | 75 | 75 | 75 | 70 |
| Non-fat Milk Powder, percent | 4 | 4 | 4 | 4 | 4 | 4 |
| Bromate (KBrO$_3$), p.p.m | 48 | 48 | 48 | 24 | 48 | 48 |
| Iodate (KIO$_3$), p.p.m | 12 | 12 | 12 | 6 | 12 | 12 |
| Additive F, percent | | 0.5 | 0.5 | 0.5 | 0.5 | |
| Monocalcium phosphate, percent | | | 0.25 | | | |
| Calcium stearyl 2-lactylate, percent | | | | | 0.2 | 0.2 |
| Tests, percent: | | | | | | |
| Volume | 100 | 102 | 102 | 94 | 105 | 103 |
| Softness, 4th day | 100 | 102 | 103 | 98 | 111 | 102 |

TABLE 1(b)
[4% Non-fat milk powder—Continuous mix breads—Score of breads of Table 1(a)]

| Test No | 2 | 4 | 6 | 8 | 10 | 12 |
|---|---|---|---|---|---|---|
| Score: | | | | | | |
| Grain | 3.0 | 2.7 | 2.0 | 3.0 | 4.0 | 3.9 |
| Symmetry | 3.8 | 3.7 | 3.7 | 3.6 | 3.9 | 3.7 |
| Texture | 2.0 | 4.0 | 3.0 | 3.0 | 4.0 | 4.0 |
| Crumb color | 3.3 | 3.3 | 3.3 | 3.5 | 4.0 | 4.0 |
| Taste | 2.1 | 3.6 | 3.5 | 3.5 | 3.7 | 3.6 |
| Odor | 2.8 | 3.5 | 3.5 | 3.5 | 3.5 | 3.5 |
| Oven spring | 3.7 | 3.5 | 3.4 | 3.4 | 3.7 | 3.5 |
| Total score | 21.3 | 24.3 | 22.4 | 23.5 | 26.8 | 26.2 |
| Average score | 3.04 | 3.47 | 3.20 | 3.36 | 3.83 | 3.74 |
| Percent | 100 | 114 | 105 | 110 | 126 | 123 |
| Overall average, percent | 100 | 106 | 103 | 101 | 114 | 109 |

TABLE 2(a)
[No milk powder—Continuous mix breads]

| Test No | 1 | 3 | 5 | 7 | 9 | 11 |
|---|---|---|---|---|---|---|
| Variables: | | | | | | |
| Flour, percent | 100 | 100 | 100 | 100 | 100 | 100 |
| Water, percent | 67 | 72 | 72 | 72 | 72 | 67 |
| Bromate (KBrO$_3$), p.p.m | 48 | 48 | 48 | 24 | 48 | 48 |
| Iodate (KIO$_3$), p.p.m | 12 | 12 | 12 | 6 | 12 | 12 |
| Additive F, percent | | 0.5 | 0.5 | 0.5 | 0.5 | |
| Monocalcium phosphate, percent | | | 0.25 | | | |
| Calcium stearyl 2-lactylate, percent | | | | | 0.2 | 0.2 |
| Tests: | | | | | | |
| Volume, percent | 100 | 102 | 95 | 99 | 99 | 99 |
| Softness, 4th day, percent | 100 | 107 | 97 | 103 | 100 | 100 |

TABLE 2(b)
[No milk powder—Continuous mix breads—Score of breads of Table 2(a)]

| Test No | 1 | 3 | 5 | 7 | 9 | 11 |
|---|---|---|---|---|---|---|
| Score: | | | | | | |
| Grain | 3.6 | 2.7 | 2.0 | 4.0 | 3.6 | 3.6 |
| Symmetry | 3.3 | 3.5 | 3.5 | 3.6 | 3.8 | 3.6 |
| Texture | 2.5 | 4.0 | 2.0 | 3.0 | 3.5 | 3.5 |
| Crumb color | 3.0 | 3.5 | 2.5 | 3.2 | 3.0 | 3.0 |
| Taste | 3.0 | 3.9 | 3.5 | 3.8 | 3.8 | 3.7 |
| Odor | 3.0 | 4.0 | 3.5 | 3.8 | 3.8 | 3.6 |
| Oven spring | 3.6 | 3.5 | 3.5 | 3.6 | 3.8 | 3.6 |
| Total score | 22.0 | 25.1 | 20.5 | 25.0 | 25.3 | 24.6 |
| Average score | 3.14 | 3.59 | 2.93 | 3.57 | 3.62 | 3.52 |
| Percent | 100 | 114 | 93 | 114 | 115 | 112 |
| Overall average, percent | 100 | 107 | 95 | 105 | 105 | 104 |

*Example II*

A series of breads were baked following the sponge-dough procedure. The formula employed was as follows:

| Ingredient | Sponge | | Dough | |
|---|---|---|---|---|
| | Percent | Grams | Percent | Grams |
| Flour (Winter Wheat) | 75 | 3,000 | 25 | 1,000 |
| Water | 45 | 1,800 | 13 | 520 |
| Yeast | 3.5 | 140 | | |
| Yeast food | 0.5 | 20 | | |
| Sugar | | | 14 | 560 |
| Salt | | | 2 | 80 |
| Non-fat dry milk | | | 2 | 80 |
| (a) Shortening (a non-emulsified, partially hydrogenated vegetable oil) | | | 10 | 400 |
| (a) Emulsifier (a mono-diglyceride containing 40% monoglyceride) | | | 1.5 | 60 |
| (a) Additive comprising 70% karaya, 20% guar and 10% carrageenan | | | 0.5 | 20 |

(a) = Experimental variables.

The procedure used was as follows:

| | Sponge | Dough |
|---|---|---|
| Mixing time* | 1 min. at 1st speed<br>3 min. at 3rd speed | 1 min. at 1st speed (See below) at 3rd sp. |
| Temperature | 78° F | 81° F. |
| Fermentation time | 4 hours | 20 min. |
| Scaling weight | | 18½ oz. |
| Intermediate proof | | 10 min. |
| Proof time | | 60 min. |
| Baking temperature | | 425° F. |
| Baking time | | 24 min. |

*Hobart M-800 with bowl and dough hook.

Ten-loaf batches were baked from each dough. Two of the loaves from each dough were scored twenty-four hours after baking, and moisture determinations were made on two additional loaves one hour after baking and after four days of storage.

Softness tests were conducted on two loaves after two days of storage and on another two loaves after four days of storage at approximately 70° F. Taste tests were conducted after four days of storage using a panel of twenty members. Taste differences were also determined on the fourth day after baking.

The following tables describe the variables made in each of the four doughs. Also shown are the results of the scoring which took place twenty-four hours after baking.

TABLE 3.—VARIABLES

| Dough No. | Shortening | | Emulsifier | | Additive | | Total water absorption, percent | Minutes; Dough mixing at 3rd speed |
|---|---|---|---|---|---|---|---|---|
| | Percent | Grams | Percent | Grams | Percent | Grams | | |
| 1 | 10 | 400 | 1.5 | 60 | None | None | 58 | 6 |
| 2 | 10 | 400 | 1.5 | 60 | 0.5 | 20 | 63 | 7 |
| 3 | 4 | 160 | 1.5 | 60 | 0.5 | 20 | 63 | 7 |
| 4 | 4 | 160 | 0.8 | 32 | 0.5 | 20 | 63 | 7 |

TABLE 4.—BREAD SCORE

| Bread from Dough No. | Spec. vol., cu. in./oz. | Break and Shred | Appearance | Crust color | Grain | Texture | Crumb color | Flavor and Taste |
|---|---|---|---|---|---|---|---|---|
| 1 | 8.2 | Very good | Very good | Excellent | Good* | Good | Creamy | Very good. |
| 2 | 8.5 | do | do | do | do | do | do | Do. |
| 3 | 8.5 | do | do | do | do | do | do | Do. |
| 4 | 8.5 | do | do | do | do | do | do | Do. |

*Slightly open.

During processing, all of the doughs were dry, smooth and pliable, and all handled and machined well. All of the bread baked was very good in appearance, break and shred, flavor and taste, and excellent in crust color. The addition of the additive of this invention improved the volume slightly, gave the grain more uniformity and the texture was slightly silkier.

Bread softness tests were conducted using a Baker Compressimeter. Bread for these measurements were wrapped in a moisture proof film and sealed approximately one hour after baking. Measurements were made forty-eight hours, and ninety-six hours after baking according to the AACC approved method. Two loaves from each batch were tested using ten center slices from each loaf. This gave twenty separate determinations under each experimental condition. The average results are given below in Baker Compressimeter-grams per 2.0 mm. compression. Softer bread gives lower values.

| Storage Time | Dough Numbers | | | |
|---|---|---|---|---|
| | 1 | 2 | 3 | 4 |
| 48 hrs | 17.05 | 14.65 | 14.33 | 16.0 |
| 96 hrs | 23.43 | 17.95 | 17.63 | 22.53 |

From the above results, it can be seen that the addition of 0.5% of the additive of this invention, together with an increase in water absorption of 5% improves bread softness so long as the level of the emulsifier is kept constant. A decrease in shortening from 10% to 4% does not alter softness.

The freshness of the bread was then evaluated by a panel of twenty members. In preparation for this test, loaves of the bread were individually wrapped and sealed in a moisture proof film approximately one hour after baking, and were stored at approximately 70° F. for four days. An eight point rating scale was employed as follows:

Descriptive term: Numerical value
- Very fresh _____ 8
- Fresh _____ 7
- Moderately fresh _____ 6
- Slightly fresh _____ 5
- Slightly stale _____ 4
- Moderately stale _____ 3
- Stale _____ 2
- Very stale _____ 1

Only the descriptive terms were given to the twenty panel members. Numerical values were used for analysis of the data.

For panel evaluation of the bread, slices of 0.5 inch thickness were cut from the loaves discarding 1.5 inches at each end. The slices were cut in two vertically, then packaged with a code number and sealed in moisture-proof cellophane bags. Panel members were directed to judge the freshness of each sample and to record their judgment of its freshness on the rating scale blank supplied for the purpose.

The average ratings obtained were as follows:

Bread No. 1 _____ 5.45
Bread No. 2 _____ 5.85
Bread No. 3 _____ 5.70
Bread No. 4 _____ 5.15

No differences in flavor or taste were detected between loaves of the four different batches after a four day storage period.

The moisture content of the breads was determined one hour after baking. Additional loaves were packed in polyethylene bags one hour after baking. The bags were opened immediately before analysis at ninety-six hours after baking. The results were as follows:

| Bread from Dough No. | Percent Moisture | |
|---|---|---|
| | Time after baking, hours | |
| | 1 | 96 |
| 1 | 31.3 | 30.9 |
| 2 | 32.7 | 32.7 |
| 3 | 33.8 | 33.3 |
| 4 | 33.5 | 33.3 |

*Example III*

Baking tests were conducted using a rich "sweet goods" formula, based on 700 grams of flour. The formula was as follows:

STRAIGHT DOUGH

| | Percent |
|---|---|
| Winter wheat flour | 100.0 |
| Shortening (partially hydrogenated vegetable oil) | 20.0 |
| Emulsifier (TEM 4X, a tartaric acid ester of glyceryl monostearate) | 2.0 |
| Dry yeast (equal to 9% compressed yeast) | 3.6 |
| Yeast food (Arkady) | 0.5 |
| Salt | 1.5 |
| Skim milk powder | 4.0 |
| Sugar | 23.0 |
| Water | 61.0 |

All of the dry ingredients except yeast were placed in a Hobart mixer bowl (Model A-120) and premixed for one-half minute at the first speed with a dough hook.

The following table gives the results of the several runs:

TABLE 4.—SWEET GOODS BAKE TEST

|  | Control | Bake No. | | | | | |
|---|---|---|---|---|---|---|---|
|  |  | 1 | 2 | 3 | 4 | 5 | 6 |
| Variables: | | | | | | | |
| Flour—Winter wheat, percent | 100 | 100 | 100 | 100 | 100 | 100 | 100. |
| Water, percent | 61 | 65 | 66 | 67 | 67 | 67 | 67. |
| Shortening, percent | 20 | 20 | 20 | 20 | 15 | 10 | 5. |
| Additive E, percent | None | 0.5 | 0.5 | 0.5 | 0.5 | 0.5 | 0.5. |
| Dough: | | | | | | | |
| Clean-up time, percent | 100 | 100 | 100 | 100 | 92 | 92 | 79. |
| Machining | Excellent | Very good | Good | Sl. sticky | Excellent | Excellent | Excellent. |
| Proof time, percent | 100 | 80 | 80 | 77 | 73 | 73 | 67. |
| Baked Prod.: | | | | | | | |
| Volume, percent | 100 | 86 | 88 | 82 | 88 | 102 | 102. |
| Softness, percent | 100 | 104 | 106 | 97 | 104 | 103 | 104. |
| Symmetry | Good | Fair | Fair | Poor | Fair | Good | Good. |
| Oven spring | do | do | Poor | do | do | do | Very good. |
| Grain | do | do | Sl. poor | do | do | do | Do. |

To reactivate the yeast, the dry yeast was then added to 14.3% of the dough water which had been previously heated to 110–112° F. The yeast slurry was added to the dry ingredients with the remainder of the dough water, and the mixture was mixed for one minute at the first speed.

The mixture was then mixed to clean-up at second speed, the time recorded, and an additional three minutes of mixing was conducted at second speed. The dough temperature at this point was 83° F.

The dough was placed into a greased bowl and set in a fermentation cabinet at 81° F. and 75% relative humidity for 90 minutes. The bowl was then removed, and the dough scaled off into 460 gram pieces. These pieces were folded twice and given a ten minute intermediate proof.

The dough was sheeted at 5/16" and 3/16", curled, and formed. No flouring of the dough was allowed throughout the process. It was then panned and proofed to 3/8" above pan at 96° F. and 90% relative humidity. Baking took place at 425° F. for nineteen minutes. The product cooled for thirty minutes in the pan, cooled for an additional thirty minutes and stored in the fermentation cabinet overnight. The next day it was scored, volumes were taken, and it was then wrapped for shelf-life studies.

*Example IV*

A series of breads were made using the formula and the procedure outlined in Example II. The purpose of this test was to evaluate several of the additives of this invention. The additive was employed at a level of 0.5%, the emulsifier at a level of 0.8%, and the shortening at a level of 4%.

In the following table, Additive E contained 70% karaya gum, 20% guar gum and 10% carrageenan (Seakem 402). Additive F contained 90% karaya and 10% Seakem 402. Additive H contained 70% karaya, 20% tara gum and 10% Seakem 402. Additive I contained 70% karaya, 20% guar and 10% of Irish Moss MR-100, primarily a kappa (hot water soluble) fraction of Irish moss. Additive J contained 70% karaya, 20% guar and 10% of a partially purified grade of the carrageenan "Superfine." Additive K contained 70% karaya, 20% guar and 10% of a partially refined grade of Irish moss extractive, identified as V-2485. Additive L contained 70% karaya, 20% guar and 10% of a propylene glycol alginate (Kelcoloid HV).

The following table gives the results of the evaluation of bread baked in these tests.

TABLE 5.—BAKE TEST RESULTS

|  | Clean-up time (percent) | Machining (score) | Volume (percent) | Softness (percent) | Symmetry (score) | Oven spring (score) | Grain (score) |
|---|---|---|---|---|---|---|---|
| Control, Av. of 9 bakes | 100 | 3.8 | 100 | 100 | 3.3 | 3.2 | 3.3 |
| Additive E, Av. of 14 bakes | 86 | 3.4 | 109 | 105 | 3.6 | 3.5 | 3.5 |
| Additive H, Av. of 2 bakes | 83 | 3.3 | 107 | 109 | 3.1 | 3.1 | 3.1 |
| Additive I, Av. of 2 bakes | 69 | 3.3 | 110 | 110 | 3.1 | 3.1 | 3.5 |
| Additive J, Av. of 2 bakes | 105 | 3.5 | 109 | 107 | 3.5 | 3.5 | 3.5 |
| Additive K, Av. of 3 bakes | 93 | 3.5 | 109 | 105 | 3.5 | 3.4 | 3.5 |
| Additive L, Av. of 4 bakes | 100 | 3.5 | 111 | 105 | 3.6 | 3.4 | 3.8 |
| Additive F, Av. of 4 bakes | 93 | 3.4 | 112 | 108 | 3.5 | 3.5 | 3.5 |
| Additive F, In sponge | 92 | 3.5 | 117 | 111 | 3.5 | 3.5 | 3.8 |
| Additive E, In sponge | 67 | 3.0 | 107 | 104 | 3.3 | 3.7 | 3.6 |

*Example V*

Biscuits were prepared in accordance with the formula given in the table below. The formula used was based on 1,000 grams of flour, and was mixed in a Hobart mixer (Model A-120) with a dough hook.

The dry ingredients, except baking soda, were placed in a bowl and blended for one minute at speed number 1. Fifty-nine percent of the water was then added and the mixture blended for ten minutes at speed 1. The baking soda was dissolved in the remaining water and the mixture added to the dough and mixed for an additional five minutes. The final dough temperature was 70° F.

The dough was rolled out to ¼″ thickness with a rolling pin using a wooden guide to obtain uniform thickness. The dough was then cut with a dough cutter and the pieces were placed in a can, sealed and allowed to proof one hour at room temperature. The sealed can was stored in a refrigerator for three weeks, after which it was opened and the contents baked. Evaluations of the baked goods is given in the table following.

of mixing the ingredients to clean-up time was reported and additional mixing was given so that the total mixing time was twice the clean-up time. The sponge temperature was 78° F.±2°. The sponge was placed in greased bowls and then deposited in a fermentation cabinet at 81° F. and 75% relative humidity for four hours.

In the dough stage, the sponge was knocked down and placed in a mixing bowl along with the following ingredients:

| | Percent |
|---|---|
| Winter wheat flour | 25.0 |
| Granulated sugar | 14.0 |
| Salt | 2.0 |
| Skim milk powder | 2.0 |
| Vegetable shortening (no emulsifier) | 10.0 |
| Emulsifier (Myvatex 7-40) | 1.5 |
| Water (variable depending on flour absorption) | 13.8 |

TABLE 6.—BISCUIT BAKE TEST DATA

| Formula | Control | Additive E | | | Additive F | | |
|---|---|---|---|---|---|---|---|
| | | No. 1 | No. 2 | No. 3 | No. 1 | No. 2 | No. 3 |
| Flour, percent | 100 | 100 | 100 | 100 | 100 | 100 | 100 |
| Salt, percent | 2.0 | 2.0 | 2.0 | 2.0 | 2.0 | 2.0 | 2.0 |
| Dextrose, percent | 1.6 | 1.6 | 1.6 | 1.6 | 1.6 | 1.6 | 1.6 |
| S.A.P.P., percent | 3.0 | 3.0 | 3.0 | 3.0 | 3.0 | 3.0 | 3.0 |
| Skim Milk Powder, percent | 2.0 | 2.0 | 2.0 | 2.0 | 2.0 | 2.0 | 2.0 |
| Hydr. lard, percent | 10.0 | 10.0 | 5.0 | 5.0 | 10.0 | 5.0 | 5.0 |
| Water, percent | 61.5 | 66.5 | 66.5 | 66.5 | 66.5 | 66.5 | 66.5 |
| $NaHCO_3$, percent | 2.2 | 2.2 | 2.2 | 2.2 | 2.2 | 2.2 | 2.2 |
| Myvatex 7-40 emulsifier, percent | | | | 0.3 | | | 0.3 |
| Additive, percent | | 0.5 | 0.5 | 0.5 | 0.5 | 0.5 | 0.5 |
| Volume, percent | 100 | 112 | 113 | 111 | 115 | 116 | 123 |
| Softness, percent | 100 | 109 | 121 | 131 | 135 | 137 | 144 |
| pH | 7.7 | 8.0 | 7.9 | 7.9 | 8.0 | 8.0 | 8.0 |
| Appearance | 3.0 | 3.7 | 3.3 | 3.6 | 3.8 | 3.5 | 3.6 |
| Symmetry | 3.0 | 3.6 | 3.7 | 3.7 | 3.8 | 3.8 | 3.6 |
| Grain | 3.7 | 3.5 | 3.7 | 3.8 | 3.7 | 3.5 | 3.9 |
| Tenderness | 3.5 | 3.2 | 3.4 | 3.6 | 3.7 | 3.5 | 3.8 |

In the table, the flour used was a short mixing biscuit flour having an ash content of 0.41%, a protein content of 10.3% and a water absorption of 58%. The emulsifier employed was Myvatex 7-40, a mono-diglyceride containing 40% monoglyceride. The abbreviation S.A.P.P. refers to sodium acid pyrophosphate. The additives E and F have the same identity as those of Example IV.

*Example VI*

Baking tests were conducted using a rich hamburger bun formula as a control. The formula is based on 1,000 grams of flour.

The dough was mixed one minute at first speed, scraped down and remixed at second speed to clean-up time times two. Dough temperature was 80° F.±2°. The floor time was twenty minutes. It was then divided into three 460 gram pieces, given a ten minute intermediate proof, sheeted at 5/16″ and 3/16″, curled and formed. No flouring of the dough was allowed throughout the process.

The dough was then panned and proofed at 96° F. and 90% R.H. for sixty minutes. It was then baked twenty-four minutes at 425° F., cooled one hour and placed in a fermentation cabinet until the next morning when it was evaluated. The results are given in the following table.

TABLE 7.—HAMBURGER ROLLS

| | Bake No. | | | | | | | | |
|---|---|---|---|---|---|---|---|---|---|
| | (Control) 1 | (Control) 2 | 3 | 4 | 5 | 6 | 7 | 8 | 9 |
| Variables: | | | | | | | | | |
| Flour | Winter | Spring | Winter | Winter | Winter | Spring | Winter | Winter | Winter. |
| Water | Standard | Standard | +3% | +3% | +3% | +8% | +8% | +8% | +5%. |
| Shortening | 10.0% | 10.0% | 10.0% | 7.0% | 8.0% | 4.0% | 4.0% | 10.0% | 5.0%. |
| Emulsifier | 1.5% | 1.5% | 1.5% | 0.7% | 1.0% | 0.8% | 1.0% | 1.0% | 1.5%. |
| Additive E | | | | | | 0.5% | 0.5% | 0.5% | 0.5%. |
| Gluten | | | | 2.0% | | | | 2.0% | |
| Score: | | | | | | | | | |
| Machining | Vy. good | Vy. good | Sl. sticky | Vy. good | Good | Good | Good | Good | Sl. sticky. |
| Symmetry | Good | Good | Good | Good | Fair | Vy. good | Vy. good | Vy. good | Excellent. |
| Oven Spring | do | do | do | do | do | Good | do | do | Fair | Do. |
| Grain | do | do | Fair | do | do | Vy. good | Good | Good | Good. |
| Flavor | do | do | Good | do | do | do | do | do | Do. |
| Volume | 100% | 108% | 106% | 104% | 109% | 115% | 107% | 108% | 102%. |
| Softness | 100% | 108% | 107% | 99% | 103% | 116% | 112% | 103% | 115%. |

The sponge had the following composition:

| | Percent |
|---|---|
| Winter wheat flour | 75.0 |
| Yeast food (Arkady) | 0.5 |
| Water (variable depending on flour absorption) | 39.0 |
| Active dry yeast (equal to 3.5% compressed yeast) | 1.4 |
| Yeast water at 110–113° F. to reactivate yeast | 5.4 |

These materials were mixed in a Hobart mixer, Model A-120, using a dough hook at the first speed. The time

I claim:
1. An additive for baked goods consisting essentially of karaya gum and from 2% to 20%, based on the weight of the additive of a material selected from the group consisting of algins and carrageenans.

2. As a new article of manufacture, baked goods containing flour and an additive consisting essentially of, from about 0.1% to about 0.9% karaya gum, and from about 0.02% to about 0.1% of a material selected from the group consisting of algins and carrageenans, the percentages being by weight of the flour.

3. A dough comprising flour, water, a leavening agent, and an additive consisting essentially of from about 0.1% to about 0.9% karaya gum, and from about 0.02% to about 0.1% of a material selected from a group consisting of algins and carrageenans, the percentages being by weight of the flour.

4. A dough comprising flour, water, a leavening agent, an additive consisting essentially of from about 0.1% to about 0.9% karaya gum and from about 0.02% to about 0.1% of a material selected from the group consisting of algins and carrageenans, and from about 5 to about 15 parts by weight of water in excess of that amount required by the water absorption of the flour to each part by weight of additive, the percentages being by weight of the flour.

5. A process for retarding the staling of leavened baked goods comprising the steps of adding to a dough containing flour, aqueous material, and a leavening agent, an additive comprising from about 0.1% to about 0.9% karaya gum and from about 0.02% to about 0.1% of a material selected from the group consisting of algins and carrageenans, forming the dough, and baking it, the percentages being by weight of the flour.

6. The process of claim 5, wherein an additional increment of water is added to the dough, the additional increment representing an excess over that amount normally required by the absorption value of the flour, but insufficient to cause difficulty in machining the dough.

7. A process for retarding the staling of leavened baked goods comprising the steps of adding to a dough containing flour, water, a leavening agent, and calcium stearyl 2-lactylate as an emulsifier, (1) an additive consisting essentially of from about 0.1% to about 0.9% karaya gum and from about 0.02% to about 0.1% of a material selected from the group consisting of algins and carrageenans, and (2) from about 5 to about 15 parts by weight of water in excess of that amount required by the water absorption of the flour for each part by weight of additive, forming the dough, and baking it, all percentages being by weight of the flour.

8. In a continuous process of bread making, the improvement comprising the step of adding to the dough about 4% of non-fat milk solids and an additive consisting essentially of from about 0.1% to about 0.9% karaya gum and from about 0.02 to about 0.1% of a material selected from the group consisting of algins and carrageenans, all percentages being by weight of the flour.

References Cited by the Examiner
UNITED STATES PATENTS

| | | | |
|---|---|---|---|
| 3,023,104 | 2/1962 | Battista | 99—90 |
| 3,027,258 | 3/1962 | Markakis et al. | 99—207 |
| 3,033,686 | 5/1962 | Landfried et al. | 99—91 |
| 3,054,683 | 9/1962 | Hendel et al. | 99—207 |

OTHER REFERENCES

Bayfield, E. G., Baker's Digest, vol. 32, No. 3, June 1958 (pages 42 to 45, 73).

Glabe et al., Cereal Science Today, vol. 2, No. 6, July 1957, pages 159–162.

A. LOUIS MONACELL, *Primary Examiner.*

BEATRICE H. STRIZAK, *Examiner.*

S. J. BAICKER, *Assistant Examiner.*